United States Patent
Pahle

(10) Patent No.: US 7,963,375 B2
(45) Date of Patent: Jun. 21, 2011

(54) POLE WHEEL WHICH CAN BE CONNECTED TO A WHEEL HUB OF A MOTOR VEHICLE

(75) Inventor: Wolfgang Pahle, Bad Wiessee (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 188 days.

(21) Appl. No.: 11/652,516

(22) Filed: Jan. 12, 2007

(65) Prior Publication Data

US 2007/0175715 A1    Aug. 2, 2007

Related U.S. Application Data

(63) Continuation of application No. PCT/EP2005/007599, filed on Jul. 13, 2005.

(30) Foreign Application Priority Data

Jul. 16, 2004  (DE) .................. 10 2004 034 361

(51) Int. Cl.
   *F16D 65/12* (2006.01)
   *B60T 1/00* (2006.01)
(52) U.S. Cl. .... 188/218 XL; 188/21; 188/17; 188/18 R; 188/18 A
(58) Field of Classification Search ............ 188/218 XL, 188/21, 17, 18 R, 18 A
   See application file for complete search history.

(56) References Cited

U.S. PATENT DOCUMENTS

| 3,626,226 | A | | 12/1971 | Pauwels et al. |
| 5,166,611 | A | * | 11/1992 | Kujawa et al. ............. 324/166 |
| 6,446,765 | B1 | * | 9/2002 | Dabertrand et al. ........ 188/18 A |
| 6,619,440 | B2 | | 9/2003 | Antony et al. |
| 6,642,709 | B2 | * | 11/2003 | Heimann et al. ............. 324/173 |
| 6,945,367 | B1 | * | 9/2005 | Yuhas ......................... 188/18 R |

FOREIGN PATENT DOCUMENTS

| DE | 26 04 599 A1 | 8/1977 |
| DE | 101 45 947 C1 | 11/2002 |
| DE | 102 05 046 A1 | 8/2003 |
| DE | 103 57 374 A1 | 7/2005 |
| EP | 849487 A2 * | 6/1998 |
| EP | 1 088 751 A2 | 4/2001 |
| WO | WO 97/48919 A1 | 12/1997 |

OTHER PUBLICATIONS

International Search Report dated Nov. 14, 2005 (Four (4) pages).
Form PCT/IB/326, 373, PCT/ISA/237 and PCT/IB/338, (International Preliminary Report on Patentability), including English Translation (Fourteen (14) pages).

* cited by examiner

*Primary Examiner* — Bradley T King
*Assistant Examiner* — Mahbubur Rashid
(74) *Attorney, Agent, or Firm* — Crowell & Moring LLP

(57) ABSTRACT

A pole wheel is described, which can be connected to a wheel hub of a motor vehicle. The pole wheel comprises an annular-shaped wheel ring extending in a radial plane, and forming an outer edge comprising a plurality of openings arranged at substantially equal angular distances in relation to each other. The pole wheel also includes a dimensionally stable stop formed directly or indirectly on the wheel ring. The stop engages the brake disc connected to the wheel hub such that the brake disc is retained in an axial direction.

15 Claims, 4 Drawing Sheets

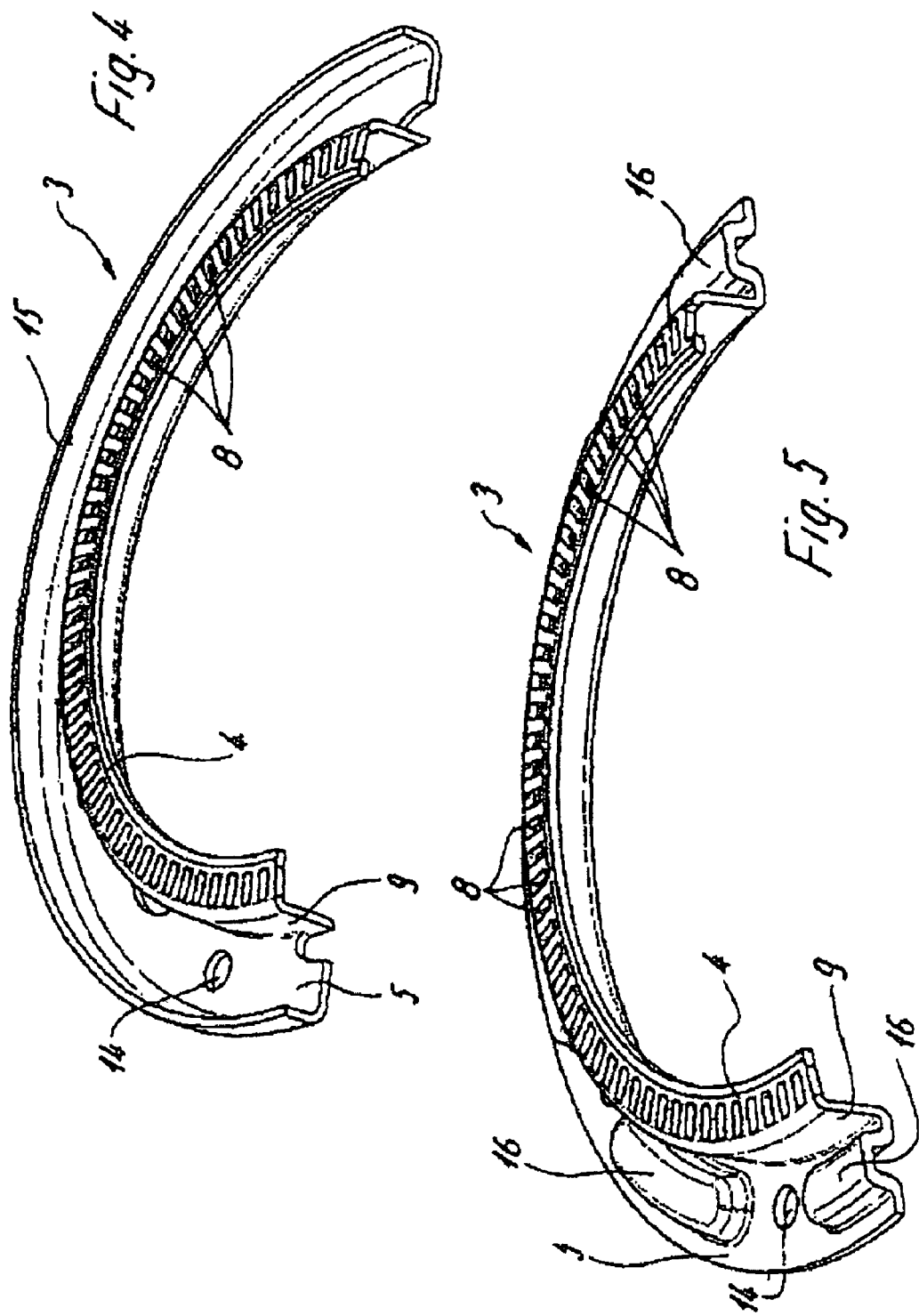

POLE WHEEL WHICH CAN BE CONNECTED TO A WHEEL HUB OF A MOTOR VEHICLE

CROSS REFERENCE TO RELATED APPLICATIONS

This application is a continuation of PCT International Application No. PCT/EP2005/007599, filed Jul. 13, 2005, which claims priority under 35 U.S.C. §119 to German Patent Application No. 10 2004 034 361.6 filed Jul. 16, 2004, the entire disclosure of which is herein expressly incorporated by reference.

BACKGROUND AND SUMMARY OF THE INVENTION

The present invention relates to a pole wheel which can be connected to a wheel hub of a motor vehicle having an annular collar which extends in the radial direction, forms an outer edge, and is provided with a large number of apertures which are arranged at substantially identical angular intervals from one another.

Pole wheels, also commonly referred to as exciter wheels or exciter rings for a wheel speed sensor, are used as functional parts of anti-lock braking systems (ABS) in motor vehicles, where they are usually fastened to the associated wheel hub of the motor vehicle in the attachment region of a disc brake.

In general, a disc brake assembly includes a brake disc, which is connected to the wheel hub and with which brake pads make contact in order to slow the motor vehicle. The braking operation is performed by the friction linings of the brake pads which bear against the brake disc.

In addition to the brake disc, the disc brake assembly includes a pole wheel which is fastened to the wheel hub in a rotationally fixed manner, and which is operatively connected to a sensor. A conventional pole wheel of this type is described, for example, in DE 102 05 046 A1 and DE 101 45 947 C1.

In order to transmit the braking torque to the wheel hub, the brake disc is also fastened to the wheel hub in a rotationally fixed manner, for example by using external toothed elements of the wheel hub corresponding to internal toothed elements of the brake disc, disposed in an interlocking manner.

To provide the required axial fixing of the brake disc, WO 97/48 919 A1 discloses providing a stop ring which firstly is firmly screwed to the wheel hub, and secondly bears against the brake disc. As a result, the wheel hub is substantially fixed in the axial direction. Some slight axial deflection may occur merely on account of the material-dependent elasticity of the stop ring.

In order to also prevent axial movement in one direction, DE 103 57 374 A1, which was published after the priority date of the present application, discloses a stop which is fixed in the direction of interest and against which the brake disc bears. In this case, separate components of the pole wheel are required, first for axially securing or restricting the movement of the brake disc on one side, and second for operation of said ABS.

The conventional design of pole wheels naturally leads to relatively high production and installation costs which stand in the way of optimizing the brake system.

The present invention, among other objectives, further develops pole wheels to improve their range of use and such that the associated disc brake can be produced in an overall more cost-effective manner.

According to the exemplary embodiments of the present invention, a pole wheel is provided which can be connected to a wheel hub of a motor vehicle. The pole wheel has an annular collar extending in the radial direction to form an outer edge which is provided with a large number of apertures arranged at a substantially identical angular distance from one another. According to the invention, a dimensionally stable stop is integrally formed directly or indirectly on the collar such that it rests on the brake disc in order to fix it in the axial direction, while the brake disc is connected to the wheel hub.

According to this exemplary structural configuration, the use of a separate axial securing means for the brake disc can be dispensed with in one direction. Instead, the function of axially securing the brake disc is also performed by the correspondingly modified pole wheel according to the invention.

On account of the multiple functions of the pole wheel, considerable advantages are obtained primarily in production and installation of the disc brake. In one embodiment, the collar of the pole wheel and the stop connected thereto are preferably integrally formed together. For example, the stop may have the form of a radially extending, circumferential element which extends substantially parallel to the collar, but in the opposite direction.

In this embodiment, the collar and the stop may be connected by a circumferential web which is at right angles to the latter. Alternatively, the circumferential web may be inclined, with the result that a substantially Z-shaped cross section is produced. It will be understood that in this context the web may be formed by a solid piece of material such as, for example, solid metal.

In one embodiment, one may produce the pole wheel as a stamped sheet-metal part, which results in particularly low-cost manufacture for the component.

In order to provide the stop with sufficient dimensional stability, said stop may, according to one advantageous embodiment of the invention, be provided with beads or embossed ribs. In another embodiment, it is possible to form a flange on the stop or to angle the stop at the free edge region in the same direction as the web, producing an approximate U-shaped section which is formed by the angled portion, the stop and the web.

It may be necessary to provide reinforcing elements such as those described above for increasing the dimensional stability of the stop because the collar with the apertures distributed over its circumference is, for manufacturing reasons, formed from a relatively thin metal sheet. For example, the sheet may have a thickness of about 2 mm. A sufficiently exact tooth system, which is formed by the apertures, can be produced more easily with thin metal sheets of this type.

According to a further advantageous embodiment of the invention, the entire Pole wheel is fastened to the wheel hub. For example, screws may be provided axially in relation to the wheel hub, and may be distributed over the circumference, preferably at substantially identical angular intervals. The screws are passed through the stop, and are fastened into the abovementioned hub teeth of the wheel hub which correspond to the toothed elements of the brake disc used to transmit torque.

The exemplary connection of the pole wheel comprising the collar and the stop to the wheel hub provides additional advantages over the known stop structures, since the connecting means are positioned outside of the brake disc. This configuration protects the connecting means from the intense heated generated during a braking operation, with the result that the risk of the screws becoming loose on account of being excessively heated is effectively reduced. Further advantageous embodiments of the invention will be described below.

Other objects, advantages and novel features of the present invention will become apparent from the following detailed description of the invention when considered in conjunction with the accompanying drawings.

BRIEF DESCRIPTION OF THE DRAWINGS

Exemplary embodiments of the invention are described below with reference to the attached drawings.

FIG. 4 shows a sectional perspective view of a further exemplary embodiment of a pole wheel according to the invention; and FIG. 5 shows a sectional perspective view of yet another exemplary embodiment of a pole wheel according to the invention.

DETAILED DESCRIPTION OF THE DRAWINGS

Figure 1:
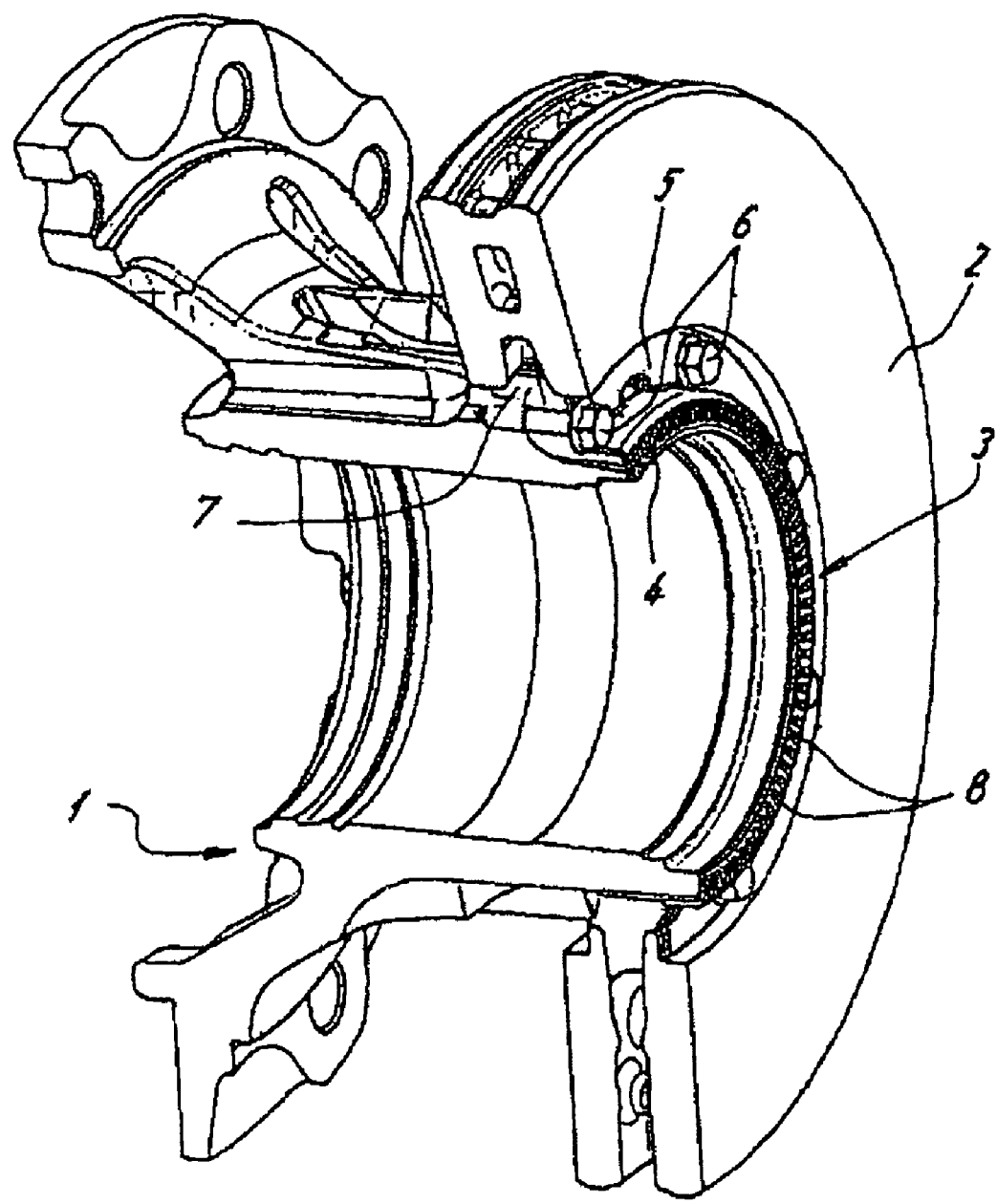
FIG. 1 shows a partial sectional perspective view of a pole wheel according to the invention, which is fitted to a wheel hub.

FIG. 1 shows an exemplary pole wheel 3 for a disc brake of a vehicle. The pole wheel 3 is connected to the end of a wheel hub 1 of a motor vehicle. A brake disc 2 is fastened to the associated free end region of the wheel hub 1 in a rotationally fixed manner. Teeth 7 are provided over the circumference of the wheel hub 1, and correspond to an internal toothed element 13 (shown in FIG. 3), which is matched to said teeth 7 of the brake disc 2. With this configuration the braking torques can be transmitted from the brake disc 2 to the wheel hub 1.

The pole wheel 3 includes a circumferential, radially oriented annular collar 4, which is provided with a large number of apertures 8 that are arranged at substantially identical angular distances from one another.

A circumferential web 9, which runs in the direction of the brake disc 2, is integrally formed at an angle to the collar 4 which bears against the free end face of the wheel hub 1. The web 9 is adjoined at an angle by a stop 5 in the form of a circumferential flange which bears against the brake disc 2 and forms an axial fixing means for said brake disc 2 on one side.

The exemplary web 9 may be formed at a selected angle in relation to the collar 4. This selected angle may be a right angle or may be another angle such that the web 9 forms a taper with the collar 4. The stop 5 and collar 4 may run parallel or at an angle to one another, but in opposite directions, in the radial plane.

In order to fasten together the pole wheel 3, the collar 4 and also the stop 5, through-bores 14 are made in the stop 5, preferably at substantially identical angular distances. Screws 6 whose respective threaded shank 11 is screwed into a threaded hole 10 in a tooth 7 of the wheel hub 1 are passed through said through-bores 14.

The connections of the stop 5 and of the entire Pole wheel 3 are located outside the axially fixed or displaceable brake disc 2, thus prevent the screws 6 from being subjected to excessive heat, as could otherwise occur on account of the frictional heat of the brake disc 2 which is produced during braking.

Figure 2:
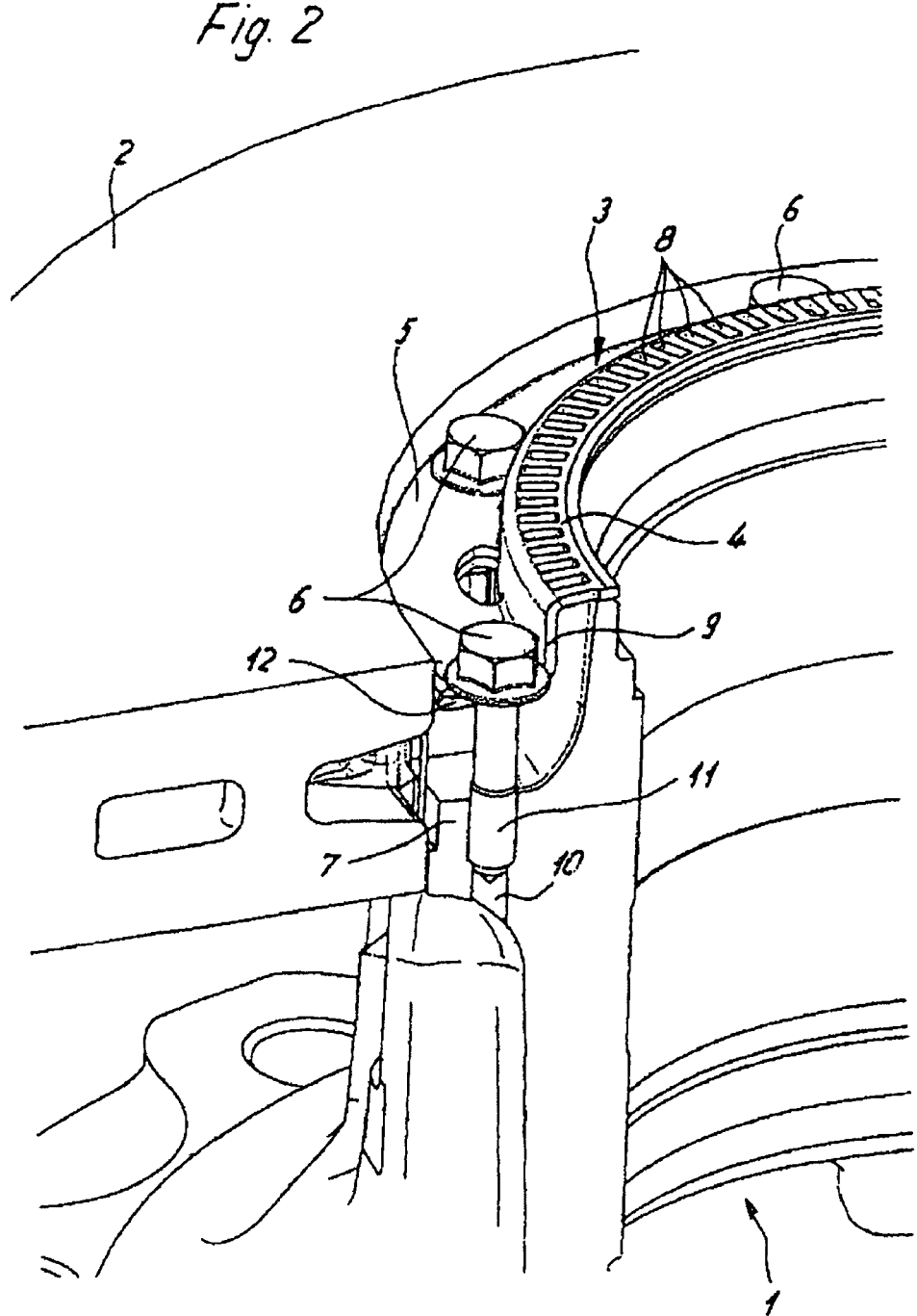
FIG. 2 shows a detail of FIG. 1, shown in a sectional perspective illustration.
Figure 3:
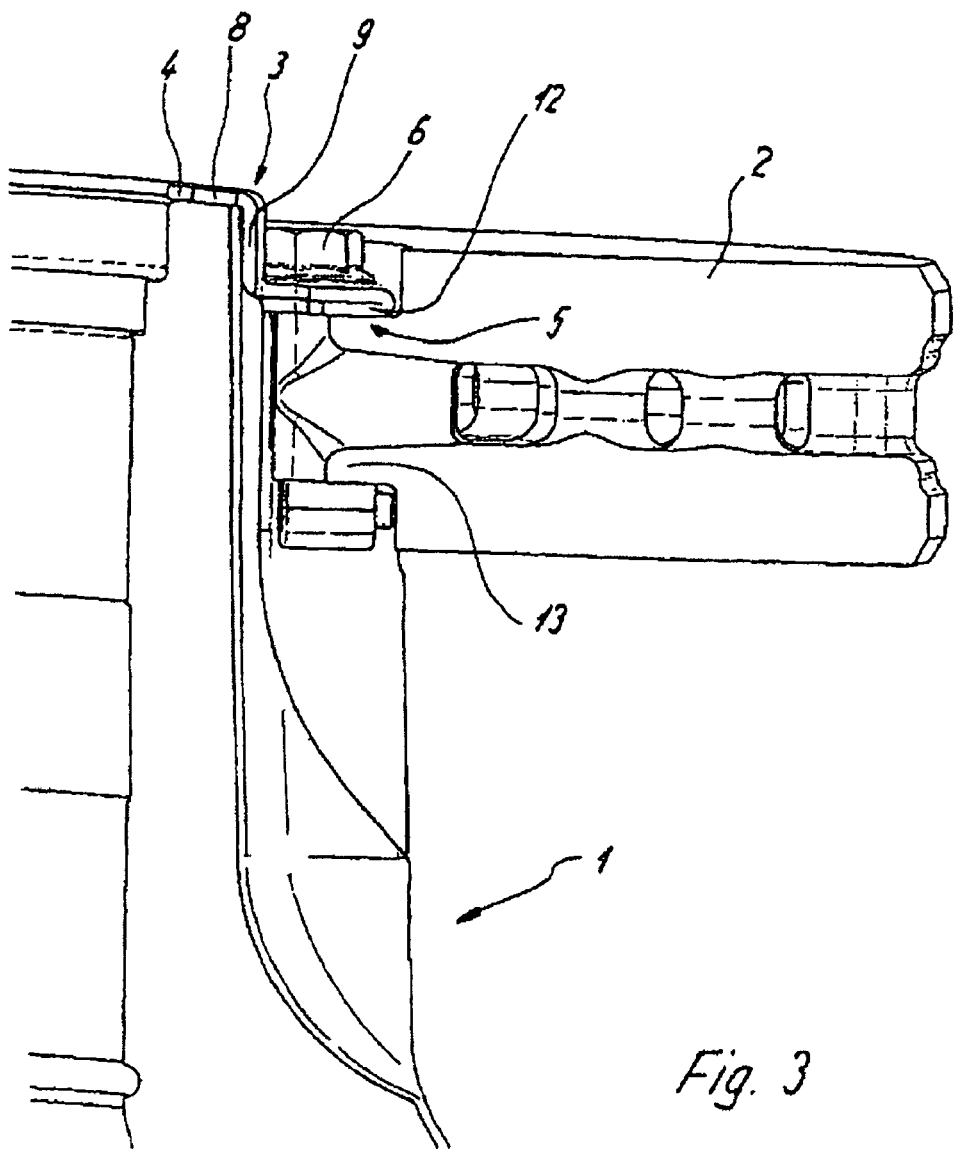
FIG. 3 shows a cross section of another exemplary embodiment of the invention fitted to a wheel hub.

FIGS. 2 and 3 show that the exemplary stop 5 is flanged in order to form a doubled-over section 12 in order to increase its dimensional stability. As a result, the deformation forces which are produced by braking can be absorbed without causing deformation of the parts.

In another exemplary embodiment, a different approach is used for increasing the dimensional stability, and for increasing the resistance moment of the stop 5. As is shown in FIG. 4, the exemplary pole wheel 3 comprises an angled edge 15 in the circumferential region which is opposite to the collar 4, and wherein the angled edge 15 extends parallel to and in the same direction as the web 9. This embodiment results in a U-shaped cross section being formed by the assembled elements.

FIG. 5 shows yet another embodiment of the exemplary pole wheel comprising beads 16 which are distributed over the circumference, preferably uniformly, in order to reinforce the stop 5. The beads 16 may be introduced by embossing to form a rise on the face of the stop 5 which faces the collar 4, while the opposite face is respectively formed with a corresponding recess. In this embodiment, the beads 16 may be formed in accordance with the radius of curvature and may assume an elongate shape.

A through-hole 14 may be disposed between two beads 16, with the distance between the individual beads 16 being kept sufficiently large that the head of the screw which is inserted therein can rest on the stop 5 without interference. A tool, for example in the form of a wrench, can be readily used to fasten the screw.

Those of skill in the art will understand that it is also possible to use other reinforcing elements in place of the shown angled edge 15 or beads 16. For example, elements such as ribs or the like may be formed to reinforce the pole wheel 3.

The following list of reference symbols will facilitate the interpretation of the drawings and of the preceding discussion.

1. Wheel hub
2. Brake disc
3. Pole wheel
4. Collar
5. Stop
6. Screw
7. Tooth
8. Aperture
9. Web
10. Threaded hole
11. Threaded shank
12. Doubled-over section
13. Tooth system
14. Through-bore
15. Edge
16. Bead The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake assembly, comprising:
   a pole wheel;
   a wheel hub of a motor vehicle; and
   a brake disc,
   wherein the pole wheel is connectable to the wheel hub, has
      an annular collar which extends in the radial direction, forms an outer edge, is provided with multiple apertures arranged at substantially identical angular intervals, and
      a dimensionally stable stop is integrally formed with the collar and engages the brake disc to axially fix the brake disc to the wheel hub when the pole wheel is connected to the wheel hub, further wherein the dimensionally stable stop axially fixes the brake disc by biasing the brake disc against a dimensionally stable stop on the wheel hub adjacent to a brake rotor portion of the brake disc.

2. The disc brake assembly as claimed in claim 1, wherein the stop comprises a circumferential flange extending substantially parallel to and in an opposite direction to the collar.

3. The disc brake assembly as claimed in claim 1, wherein the stop and the collar are connected by a generally axially oriented web disposed at an angle in relation to the collar.

4. The disc brake assembly as claimed in claim 3, wherein the web extends at selected angles relative to the stop and to the collar.

5. The disc brake assembly as claimed in claim 3, wherein the collar, the stop and the web are integrally formed as a stamped part.

6. The disc brake assembly as claimed in claim 1, wherein through-bores are provided in the stop to allow passage of screws used to fasten the pole wheel to the wheel.

7. The disc brake assembly as claimed in claim 6, wherein the screws engage into threaded holes of an external toothed element formed on the wheel hub, the external toothed element corresponding to an internal toothed element of the brake disc.

8. The disc brake assembly as claimed in either of claim 6, wherein the through-bores are at a substantially identical angular distance from one another.

9. The disc brake assembly as claimed in claim 1, wherein the stop comprises reinforcing elements in order to increase its flexural rigidity.

10. The pole wheel as claimed in claim 9, wherein the reinforcing elements comprise an outer edge portion of the stop forming an angled edge which extends approximately parallel to and in substantially a same direction as the web.

11. The pole wheel as claimed in claim 9, wherein the reinforcing elements comprise at least one of beads and ribs.

12. The pole wheel as claimed in claim 11, wherein the beads are embossed.

13. The pole wheel as claimed in claim 11, wherein a through-bore is disposed between pairs of beads.

14. The pole wheel as claimed in claim 9, wherein the stop comprises a doubled-over section which is formed by flanging.

15. The pole wheel as claimed in claim 1, wherein the stop comprises a circumferential flange extending at an angle to and in an opposite direction to the collar.

* * * * *